(12) United States Patent
Steinberg et al.

(10) Patent No.: US 7,792,335 B2
(45) Date of Patent: Sep. 7, 2010

(54) METHOD AND APPARATUS FOR SELECTIVE DISQUALIFICATION OF DIGITAL IMAGES

(75) Inventors: Eran Steinberg, San Francisco, CA (US); Peter Corcoran, Claregalway (IE); Petronel Bigioi, Galway (IE)

(73) Assignee: FotoNation Vision Limited, Galway (IE)

( * ) Notice: Subject to any disclaimer, the term of this patent is extended or adjusted under 35 U.S.C. 154(b) by 1077 days.

(21) Appl. No.: 11/460,218

(22) Filed: Jul. 26, 2006

(65) Prior Publication Data

US 2007/0201724 A1    Aug. 30, 2007

Related U.S. Application Data

(60) Provisional application No. 60/776,338, filed on Feb. 24, 2006.

(51) Int. Cl.
    *G06K 9/00* (2006.01)
(52) U.S. Cl. ...................................... 382/118; 382/117
(58) Field of Classification Search .............. 382/141, 382/115–118, 124–127
See application file for complete search history.

(56) References Cited

U.S. PATENT DOCUMENTS

| | | | |
|---|---|---|---|
| 5,018,017 A | 5/1991 | Sasaki et al. |
| 5,063,603 A | 11/1991 | Burt |
| 5,164,831 A | 11/1992 | Kuchta et al. |
| 5,164,992 A | 11/1992 | Turk et al. |
| 5,227,837 A | 7/1993 | Terashita |
| 5,280,530 A | 1/1994 | Trew et al. |
| 5,311,240 A | 5/1994 | Wheeler |
| 5,384,912 A | 1/1995 | Ogrinc et al. |
| 5,430,809 A | 7/1995 | Tomitaka |
| 5,432,863 A | 7/1995 | Benati et al. |
| 5,496,106 A | 3/1996 | Anderson |
| 5,572,596 A * | 11/1996 | Wildes et al. ............... 382/117 |
| 5,576,759 A | 11/1996 | Kawamura et al. |
| 5,633,678 A | 5/1997 | Parulski et al. |
| 5,680,481 A | 10/1997 | Prasad et al. |
| 5,684,509 A | 11/1997 | Hatanaka et al. |
| 5,692,065 A | 11/1997 | Prakash et al. |

(Continued)

FOREIGN PATENT DOCUMENTS

EP        1 748 378        1/2007

(Continued)

OTHER PUBLICATIONS

Huang, W. et al., "Eye Tracking with Statistical Leaning and Sequential Monte Carlo Sampling," IEEE, ICICS-PCM 2003, Dec. 15-18, 2003, pp. 1873-1878.

(Continued)

*Primary Examiner*—Vu Le
*Assistant Examiner*—Alex Liew
(74) *Attorney, Agent, or Firm*—Andrew V. Smith

(57) ABSTRACT

An unsatisfactory scene is disqualified as an image acquisition control for a camera. An image is acquired. One or more eye regions are determined. The eye regions are analyzed to determine whether they are blinking, and if so, then the scene is disqualified as a candidate for a processed, permanent image while the eye is completing the blinking.

22 Claims, 13 Drawing Sheets

U.S. PATENT DOCUMENTS

| | | | |
|---|---|---|---|
| 5,706,362 A | 1/1998 | Yabe | |
| 5,774,591 A * | 6/1998 | Black et al. | 382/236 |
| 5,774,747 A | 6/1998 | Ishihara et al. | |
| 5,774,754 A | 6/1998 | Ootsuka | |
| 5,802,208 A | 9/1998 | Podilchuk et al. | |
| 5,802,220 A | 9/1998 | Black et al. | |
| 5,802,361 A | 9/1998 | Wang et al. | |
| 5,835,616 A | 11/1998 | Lobo et al. | |
| 5,842,194 A | 11/1998 | Arbuckle | |
| 5,963,656 A | 10/1999 | Bolle et al. | |
| 6,053,268 A | 4/2000 | Yamada | |
| 6,072,903 A | 6/2000 | Maki et al. | |
| 6,115,509 A | 9/2000 | Yeskel | |
| 6,148,092 A | 11/2000 | Qian | |
| 6,301,370 B1 | 10/2001 | Steffens et al. | |
| 6,400,830 B1 | 6/2002 | Christian et al. | |
| 6,404,900 B1 | 6/2002 | Qian et al. | |
| 6,456,737 B1 | 9/2002 | Woodfill et al. | |
| 6,504,942 B1 | 1/2003 | Hong et al. | |
| 6,556,708 B1 | 4/2003 | Christian et al. | |
| 6,606,397 B1 * | 8/2003 | Yamamoto | 382/117 |
| 6,606,398 B2 | 8/2003 | Cooper | |
| 6,633,655 B1 | 10/2003 | Hong et al. | |
| 6,661,907 B2 | 12/2003 | Ho et al. | |
| 6,697,503 B2 | 2/2004 | Matsuo et al. | |
| 6,697,504 B2 | 2/2004 | Tsai | |
| 6,754,389 B1 | 6/2004 | Dimitrova et al. | |
| 6,760,465 B2 | 7/2004 | McVeigh et al. | |
| 6,765,612 B1 | 7/2004 | Anderson et al. | |
| 6,801,250 B1 | 10/2004 | Miyashita | |
| 6,850,274 B1 | 2/2005 | Silverbrook et al. | |
| 6,876,755 B1 | 4/2005 | Taylor et al. | |
| 6,879,705 B1 | 4/2005 | Tao et al. | |
| 6,940,545 B1 | 9/2005 | Ray et al. | |
| 6,965,684 B2 | 11/2005 | Chen et al. | |
| 6,993,157 B1 | 1/2006 | Oue et al. | |
| 7,003,135 B2 | 2/2006 | Hsieh et al. | |
| 7,020,337 B2 | 3/2006 | Viola et al. | |
| 7,027,619 B2 | 4/2006 | Pavlidis et al. | |
| 7,035,440 B2 * | 4/2006 | Kaku | 382/115 |
| 7,035,456 B2 | 4/2006 | Lestideau | |
| 7,035,467 B2 | 4/2006 | Nicponski | |
| 7,038,709 B1 | 5/2006 | Verghese | |
| 7,038,715 B1 | 5/2006 | Flinchbaugh | |
| 7,050,607 B2 | 5/2006 | Li et al. | |
| 7,064,776 B2 | 6/2006 | Sumi et al. | |
| 7,082,212 B2 | 7/2006 | Liu et al. | |
| 7,099,510 B2 | 8/2006 | Jones et al. | |
| 7,110,575 B2 | 9/2006 | Chen et al. | |
| 7,113,641 B1 | 9/2006 | Eckes et al. | |
| 7,119,838 B2 | 10/2006 | Zanzucchi et al. | |
| 7,120,279 B2 | 10/2006 | Chen et al. | |
| 7,151,843 B2 | 12/2006 | Rui et al. | |
| 7,158,680 B2 | 1/2007 | Pace | |
| 7,162,076 B2 | 1/2007 | Liu | |
| 7,162,101 B2 | 1/2007 | Itokawa et al. | |
| 7,171,023 B2 | 1/2007 | Kim et al. | |
| 7,171,025 B2 | 1/2007 | Rui et al. | |
| 7,174,033 B2 | 2/2007 | Yukhin et al. | |
| 7,190,829 B2 | 3/2007 | Zhang et al. | |
| 7,200,249 B2 | 4/2007 | Okubo et al. | |
| 7,218,759 B1 | 5/2007 | Ho et al. | |
| 7,227,976 B1 | 6/2007 | Jung et al. | |
| 7,233,684 B2 * | 6/2007 | Fedorovskaya et al. | 382/118 |
| 7,254,257 B2 | 8/2007 | Kim et al. | |
| 7,274,822 B2 | 9/2007 | Zhang et al. | |
| 7,274,832 B2 | 9/2007 | Nicponski | |
| 7,551,754 B2 | 6/2009 | Steinberg et al. | |
| 2001/0028731 A1 | 10/2001 | Covell et al. | |
| 2001/0040987 A1 | 11/2001 | Bjorn et al. | |
| 2003/0068100 A1 | 4/2003 | Covell et al. | |
| 2003/0071908 A1 | 4/2003 | Sannoh et al. | |
| 2003/0160879 A1 | 8/2003 | Robins et al. | |
| 2003/0169906 A1 | 9/2003 | Gokturk et al. | |
| 2003/0190090 A1 | 10/2003 | Beeman et al. | |
| 2004/0001616 A1 * | 1/2004 | Gutta et al. | 382/118 |
| 2004/0170397 A1 | 9/2004 | Ono | |
| 2004/0213482 A1 | 10/2004 | Silverbrook | |
| 2004/0223629 A1 | 11/2004 | Chang | |
| 2004/0258304 A1 | 12/2004 | Shiota et al. | |
| 2005/0013479 A1 | 1/2005 | Xiao et al. | |
| 2005/0069208 A1 | 3/2005 | Morisada | |
| 2005/0286802 A1 | 12/2005 | Clark et al. | |
| 2006/0177100 A1 | 8/2006 | Zhu et al. | |
| 2006/0177131 A1 | 8/2006 | Porikli | |
| 2006/0204106 A1 * | 9/2006 | Yamaguchi | 382/203 |
| 2007/0091203 A1 | 4/2007 | Peker et al. | |
| 2007/0098303 A1 | 5/2007 | Gallagher et al. | |
| 2007/0154095 A1 | 7/2007 | Cao et al. | |
| 2007/0154096 A1 | 7/2007 | Cao et al. | |
| 2008/0144966 A1 | 6/2008 | Steinberg et al. | |
| 2008/0192129 A1 | 8/2008 | Walker et al. | |

FOREIGN PATENT DOCUMENTS

WO    WO 2007/060980 A1    5/2007

OTHER PUBLICATIONS

PCT Notification of Transmittal of the Intl. Search Report and Written Opinion of the Intl. Searching Authority, PCT Appln. No. PCT/US2006/30173, dated Nov. 1, 2007, 12 pgs.

PCT Notification of Transmittal of the International Search Report and the Written Opinion of the International Searching Authority, or the Declaration, PCT Application No. PCT/US2006/030315, dated May 2, 2007.

PCT Notification Concerning Transmittal of International Preliminary Report on Patentability, PCT Appln. No. PCT/US2006/30173, dated Sep. 4, 2008, 7 pgs.

Bradski Gary et al., "Learning-Based Computer Vision with Intel's Open Source Computer Vision Library", Intel Technology, 2005, pp. 119-130, vol. 9—Issue 2.

Corcoran, P. et al., "Automatic Indexing of Consumer Image Collections Using Person Recognition Techniques", Digest of Technical Papers. International Conference on Consumer Electronics, 2005, pp. 127-128.

Costache, G. et al., "In-Camera Person-Indexing of Digital Images", Digest of Technical Papers. International Conference on Consumer Electronics, 2006, pp. 339-340.

Demirkir, C. et al., "Face detection using boosted tree classifier stages", Proceedings of the IEEE 12th Signal Processing and Communications Applications Conference, 2004, pp. 575-578.

Drimbarean, A.F. et al., "Image Processing Techniques to Detect and Filter Objectionable Images based on Skin Tone and Shape Recognition", International Conference on Consumer Electronics, 2001, pp. 278-279.

EP Supplementary European Search Report, EP Appln. No. 06 78 9329, Jan. 22, 2009, 7 pgs.

Viola, P. et al., "Rapid Object Detection using a Boosted Cascade of Simple Features", Proceedings of the 2001 IEEE Computer Society Conference on Computer Vision and Pattern Recognition, 2001, pp. 1-511-1-518, vol. I.

Viola, P. et al., "Robust Real-Time Face Detection", International Journal of Computer Vision, 2004, pp. 137-154, vol. 57—Issue 2, Kluwer Academic Publishers.

Xin He et al., "Real-Time Human Face Detection in Color Image", International Conference on Machine Learning and Cybernetics, 2003, pp. 2915-2920. vol. 5.

Zhao, W. et al., "Face recognition: a literature survey, ISSN: 0360-0300, Dec. 2003, http://portal.acm.org/citation.cfm?id=954342andcoll=GUIDEanddl=GUIDEandCFID=680-9268andCFTOKEN=82843223.", ACM Computing Surveys (CSUR) archive, 2003, pp. 399-458, vol. 35—Issue 4, ACM Press.

Zhu Qiang et al., "Fast Human Detection Using a Cascade of Histograms of Oriented Gradients", Proceedings of the 2006 IEEE Computer Society Conference on Computer Vision and Pattern Recognition, 2006, pp. 1491-1498, IEEE Computer Society.

Examination Report for European Patent Application No. 06789329.7, dated Jul. 31, 2009, 5 Pages.

Final Office Action mailed Mar. 24, 2010, for U.S. Appl. No. 11/460,225, filed Jul. 26, 2006.

Non-Final Office Action mailed Sep. 22, 2009, for U.S. Appl. No. 11/460,225, filed Jul. 26, 2006.

PCT International Search Report for Application No. PCT/EP2009/000315, dated Apr. 29, 2009, 5 pages.

* cited by examiner

METHOD AND APPARATUS FOR SELECTIVE DISQUALIFICATION OF DIGITAL IMAGES

CROSS-REFERENCE TO RELATED APPLICATIONS

This application claims priority to U.S. provisional patent application No. 60/776,338, filed Feb. 24, 2006. This application is one of a series of applications filed on the same day, including one entitled DIGITAL IMAGE ACQUISITION CONTROL AND CORRECTION METHOD AND APPARATUS, Ser. No. 11/460,225, and another entitled METHOD AND APPARATUS FOR SELECTIVE REJECTION OF DIGITAL IMAGES, Ser. No. 11/460,227, by the same inventive entity and having common assignee. Each of these applications is hereby incorporated by reference.

FIELD OF THE INVENTION

The invention relates to digital image acquisition, and particularly to disqualifying a scene as a candidate for a processed, permanent image due to the presence of one or more unsatisfactory features in the image.

DESCRIPTION OF THE RELATED ART

Cameras are becoming strong computation tools. In particular, FotoNation, Inc., assignee of the present application, has developed many advantageous face detection tools. Some of these are described at U.S. patent application Ser. Nos. 10/608,776, 10/608,810, 10/764,339, 10/919,226, 11/182,718, and 11/027,001, which are hereby incorporated by reference.

This differs from using a trigger to take a picture. This also differs from waiting for an event that may or may not happen (e.g. a smile). U.S. Pat. No. 6,301,440 discloses adjusting image capture parameters based on analysis of temporary images, and awaiting taking a picture until everyone in the temporary images is smiling. The camera must await a certain event that may or may not ever happen. It is many times not acceptable to make people wait for the camera to decide that a scene is optimal before taking a picture, and there is no description in the '440 patent that would alleviate such dilemma. The '440 patent also provides no guidance as to how to detect or determine certain features within a scene.

There are also security cameras that take pictures when a subject enters the view of the camera. These generally detect motion or abrupt changes in what is generally a stagnant scene.

SUMMARY OF THE INVENTION

A method is provided for disqualifying an unsatisfactory scene as an image acquisition control for a camera. An analysis of the content of the captured image determines whether the image should be acquired or discarded. One example includes human faces. It may be determined whether an image is unsatisfactory based on whether the eyes are closed, partially closed or closing down or moving up during a blinking process. Alternatively, other non-desirable or unsatisfactory expressions or actions such as frowning, covering one's face with a hand or other occluding or shadowing of a facial feature or other key feature of a scene, or rotating the head away from the camera, etc., may be detected.

A present image of a scene is captured including a face region. One or more groups of pixels is/are identified corresponding to the region of interest, such as an eye region, or a mouth within the face region.

In the case of blink detection, it is determined whether the eye region is in a blinking process. If so, then the scene is disqualified as a candidate for a processed, permanent image while the eye is completing the blinking.

The present image may include a preview image, and the disqualifying may include delaying full resolution capture of an image of the scene. The delaying may include ending the disqualifying after a predetermined wait time.

A preview image may be used. This can provide an indication of a region of interest (ROI) where the eyes may be in the captured image. This provides a fast search in the final image of the mouth or eyes based on spatial information provided from the analysis of preview images.

The delaying may include predicting when the blinking will be completed and ending the disqualifying at approximately the predicted blink completion time. The predicting may include determining a point of a complete blinking process the scene is at, and calculating a remainder time for completion of the blinking. The calculating may include multiplying a fraction of the complete blinking process remaining times a predetermined complete blinking process duration. The predetermined complete blinking process duration may be programmed based on an average blinking process duration and/or may be determined based on estimating a time from a beginning of the blinking to the present and in view of the fraction representing the point of the complete blinking process the scene is at. The estimating may be based on analyzing a temporal capture parameter of one or more previous preview images relative to that of the present preview image. The fraction may be determined based on whether the eye that is blinking is opening or closing in the present preview image, and a degree to which the eye is open or shut.

The method may include determining whether the eye is blinking including determining a degree to which the eye is open or shut. The degree to which the eye is open or shut may be determined based on relatively analyzing the present preview image and one or more other preview images relatively acquired within less than a duration of a complete blinking process. The determining whether the eye is blinking may include determining a degree of blurriness of one or both eye lids. It may be determined what portion of a pupil, an iris, one or both eye lids or an eye white that is/are showing, or combinations thereof. A color analysis of the eye may be performed and differentiating pixels corresponding to an eye lid tone from pixels corresponding to an iris tone or pupil tone or eye white tone, or combinations thereof. A shape analysis of the eye may be performed and pixels differentiated as corresponding to an eye lid shape contrast with those corresponding to an iris shape or pupil shape or eye white shape, or combinations thereof.

The present image may include a full resolution capture image. The disqualifying may include foregoing further processing of the present image. It may be determined whether the eye is blinking including determining a degree to which the eye is open or shut. This may include relatively analyzing the present preview image and one or more other preview images relatively acquired within less than a duration of a complete blinking process. The determination of whether the eye is blinking may be based on determining a degree of blurriness of one or both eye lids.

The method may include determining a portion of a pupil, an iris, one or both eye lids or an eye white that is/are showing, or combinations thereof. A color analysis of the eye may be performed and pixels differentiated as corresponding to an eye lid tone contrasted with pixels corresponding to an iris tone or pupil tone or eye white tone, or combinations thereof. A shape analysis of the eye may be performed and pixels differentiated as corresponding to an eye lid shape contrasted with pixels corresponding to an iris shape or pupil shape or eye white shape, or combinations thereof.

The present image may include a full resolution capture image. The method may include assembling a combination image including pixels from the present image and open-eye pixels corresponding to the eye that is blinking from a different image. The different image may include a preview image or a post-view image or another full resolution image. The different image may include a lower resolution than the present image, and the assembling may include upsampling the different image or downsampling the present image, or a combination thereof. The method may also include aligning the present image and the different image, including matching an open-eye pixel region to a blinking eye region in the present image.

The invention may also be implemented to disqualify images out of a selection of images that are part of a stream, such as a video stream.

An eye region may be identified based on identifying a face region, and analyzing the face region to determine the mouth or eye region therein.

A new image may be captured due to the disqualifying to replace the present image.

A pair of images may be captured and analyzed to determine that at least one of the pair of images includes no blinking.

The interval between multiple captures can be calculated to be longer than a single blink time.

A warning signal may be provided regarding the blinking so that the photographer may be aware that she may need to take another picture The invention in its various alternatives, may address single or multiple faces in a single image, such as a group shot. A second eye region of another face may be identified within the scene. Additional eye regions may also be identified within the scene. It may be determined whether the second eye region is in a blinking process. If so, then the method may include disqualifying the scene as a candidate for a processed, permanent image while the second eye is completing the blinking. Capturing or further processing may be disqualified for full resolution images until the eye regions of each face region within the scene include no blinking eyes.

A further method is provided for automatically disqualifying an unsatisfactory scene as an image acquisition control of a camera. The method includes acquiring multiple preview images. Information is extracted from the multiple preview images. One or more changes is/are analyzed in the scene between individual images of the multiple temporary images. Based on the analyzing, it is determined whether one or more unsatisfactory features exist within the scene. The scene is disqualified as a candidate for a processed, permanent image while the one or more unsatisfactory features continue to exist.

The analyzing may include identifying one or more groups of pixels that correspond to a facial feature having an unsatisfactory configuration. The one or more groups of pixels may include an eye group, and the unsatisfactory configuration may include a blinking configuration. The one or more groups of pixels may include a mouth configuration, and the unsatisfactory configuration may include a frowning configuration. A disqualifying interval may be determined during which no processed, permanent image is to be acquired.

The analyzing may include identifying one or more groups of pixels that correspond to a facial feature having an unsatisfactory configuration. The one or more groups of pixels may include any occlusions such as a hand covering the face or a face that is turned away form the camera.

One or more processor readable storage devices having processor readable code embodied thereon are also provided. The processor readable code is for programming one or more processors to perform a method of disqualifying an unsatisfactory scene as an image acquisition control for a camera, as set forth herein above or below. The processor may be embedded as part of the camera or external to the acquisition device. The acquisition device may be a hand held camera, a stationary camera, a video camera, a mobile phone equipped with a acquisition device, a hand held device equipped with a acquisition device, a kiosk booth, such as ones used for portraits, a dedicated portrait camera such as one used for security or identifications or generically, any image capture device.

DETAILED DESCRIPTION OF THE PREFERRED EMBODIMENTS

Figure 1:
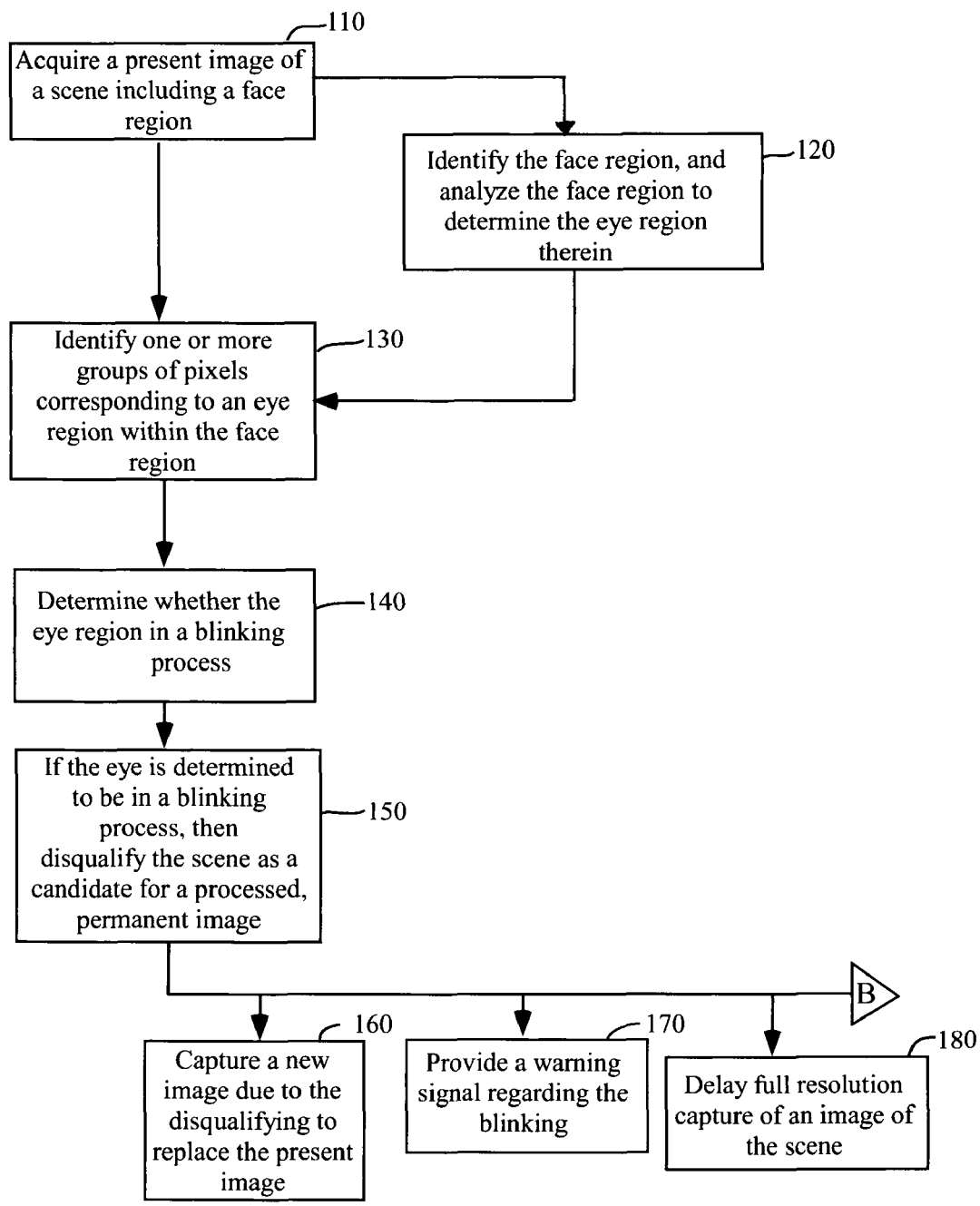
FIG. 1 illustrates a method for disqualifying a scene that includes a blinking eye in accordance with a preferred embodiment.

Systems and methods are described in accordance with preferred and alternative embodiments. These techniques provide enhanced functionality and improved usability, as well as avoiding missed shots. With them, a digital camera is able to decide when a subject's facial expression may be inappropriate, unsatisfactory or non-desirable. One example is blinking, and others include frowning occlusions and shadowing. The capture device can either not take the picture, delay the acquisition for an appropriate duration, immediately take another picture, warn a camera user, or take steps to enhance the unsatisfactory image later, or combinations of these or other steps. The camera may delay taking another picture for a certain amount of time such as roughly 300 milliseconds seconds or for an average blinking interval, or until the blinking is determined to be over. The user could be warned before snapping a picture or after the picture has been taken that the subject's eyes may have been closed or semi closed.

A predictive system is provided that disqualifies images if eyes are closed or partially closed. The system predicts when a picture cannot be taken, i.e., those times when a detected blinking process will be ongoing until it is completed. Disqualified images may be already captured and disqualified only in a post-capture filtering operation, either within the camera or on an external apparatus. The system may take multiple images to enhance the probability that one or more of the images will not be disqualified for including one or more blinking eyes. Such system is useful in the case of a group shot where the probability of one subject in the process of blinking increases as the number of subjects increase. The system, based on the number of faces in the image, can automatically determine the amount of images to be sequentially taken to provide a probability that at least one of the images will have no blinking eyes that is above a threshold amount, e.g., 50%, 60%, 67%, 70%, 75%, 80%, 90% or 95%.

An image may be generated as a combination of a present image, and a preview, post-view or other full resolution image. For example, the combination image may include a face region and some background imagery, wherein one or both eye regions, which are unsatisfactorily closed or partially closed in the present image, are replaced with one or both open eyes from the preview, post-view or other full resolution image. This feature may be combined with features presented in U.S. patent application Ser. No. 10/608,776, which is assigned to the same assignee as the present application and is hereby incorporated by reference. In the '776 application, a method of digital image processing using face detection is described. A group of pixels is identified that corresponds to a face within a digital image. A second group of pixels is identified that corresponds to another feature within the digital image. A re-compositioned image is determined including a new group of pixels for at least one of the face and the other feature.

The embodiments herein generally refer to a single face within a digital image or scene (e.g., prior to image capture or that may have already been digitally captured), and generally to "an eye". However, these descriptions can extended to both eyes on a single face, and to more than a single face (group shot), and the camera can disqualify the scene if a certain number of one or two, three, four or more eyes are determined to be blinking. The camera is able to perform the disqualifying and/or other operations, as described herein or otherwise, until a high percentage or all of the subjects have one or both of their eyes open.

In one embodiment, the camera will take the picture right after the subject completes a blinking process. The present system can be used to disqualify an image having a subject whose eyes are closed, and can take multiple images to prevent having no images that lack blinking. One of the images will likely have eyes open for each subject person, and the pictures can have a mixture of pixels combined into a single image with no eyes blinking. The camera may decide on the number of images to take based on the number of subjects in the image. The more people, the higher the likelihood of one person blinking, thus more images should be acquired. If it is acceptable for efficiency that a certain percentage of persons may be blinking in a large group shot, e.g., that is below a certain amount, e.g., 5%, then the number of images can be reduced. These threshold numbers and percentage tolerances can be selected by a camera product manufacturer, program developer, or user of a digital image acquisition apparatus. This information may be generated based on analysis of preview images. The preview image may also assist in determining the location of the eyes, so that the post processing analysis can be faster honing into the region of interest as determined by the preview analysis.

The present system sets a condition under which a picture will not be taken or will not be used or further processed after it has already been taken, and/or where an additional image or images will be taken to replace the unsatisfactory image. Thus, another advantageous feature of a system in accordance with a preferred embodiment is that it can correct an acquired blink region with a user's eye information from a preview or post-view image or another full resolution image. The present system preferably uses preview images, which generally have lower resolution and may be processed more quickly. The present system can also look for comparison of changes in facial features (e.g., of the eyes or mouth), between images as potentially triggering a disqualifying of a scene for an image capture. In such a case, the system may distinguish between a squint which is somewhat permanent or of longer duration during the session than a blink which is more a temporary state. The system may also through a comparison of multiple images determine the difference between eyes that are naturally narrow due to the location of the upper-eye-lid or the epicanthal fold, or based on a determined nationality of a subject person, e.g., distinguishing Asian from Caucasian eyes.

The description herein generally refers to handling a scene wherein an object person is blinking his or her eyes. However, the invention may be applied to other features, e.g., when a person is frowning, or when a person is unsatisfactorily gesturing, talking, eating, having bad hair, or otherwise disposed, or when another person is putting bunny ears on someone, or an animal or other person unexpectedly crosses between the camera and human subject, or the light changes unexpectedly, or the wind blows, or otherwise. One or more or all of these disqualifying circumstances may be manually set and/or overridden.

Figure 4A:
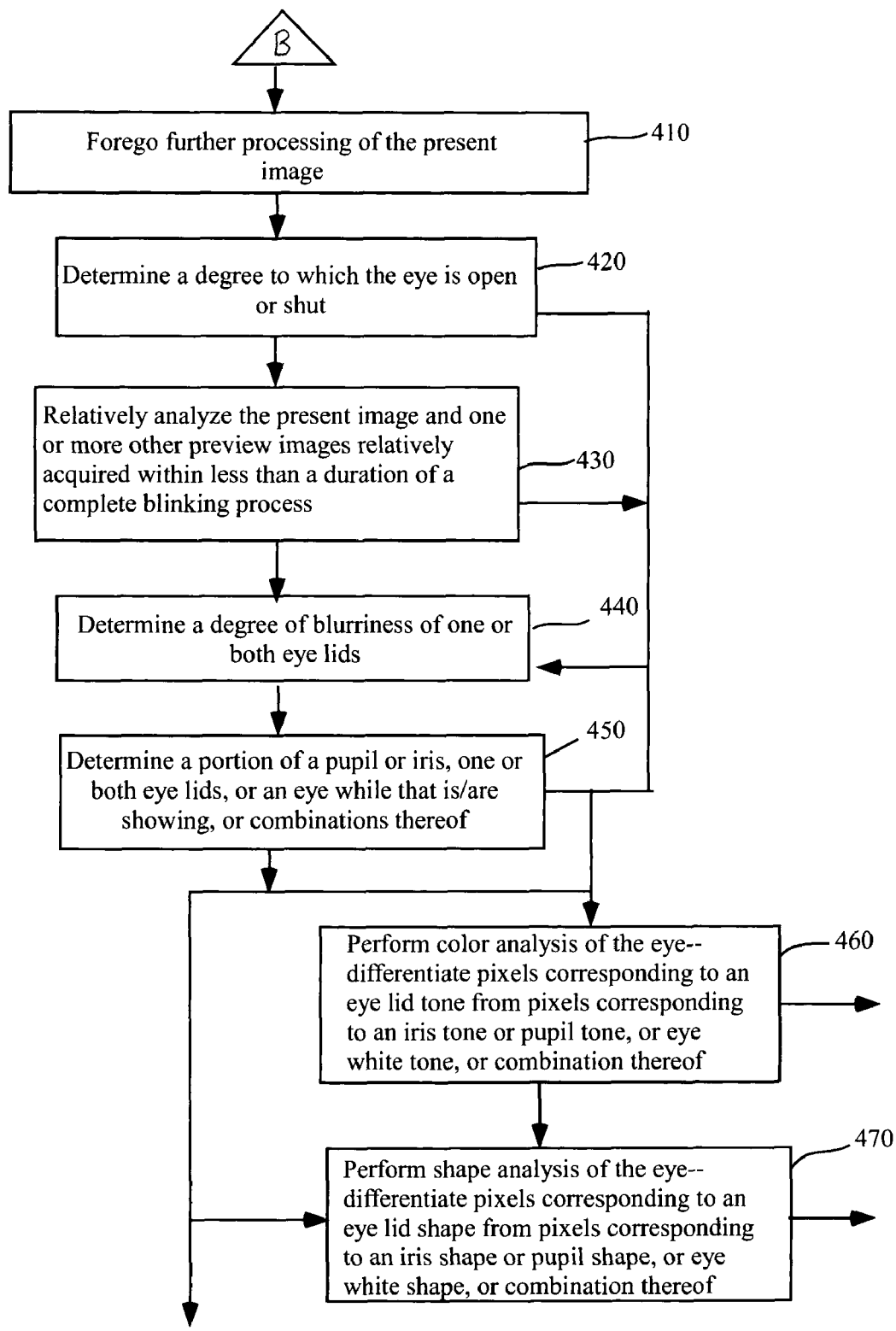
FIG. 4a illustrates a method of determining whether to forego further processing of an image in accordance with a preferred embodiment.
Figure 4B:
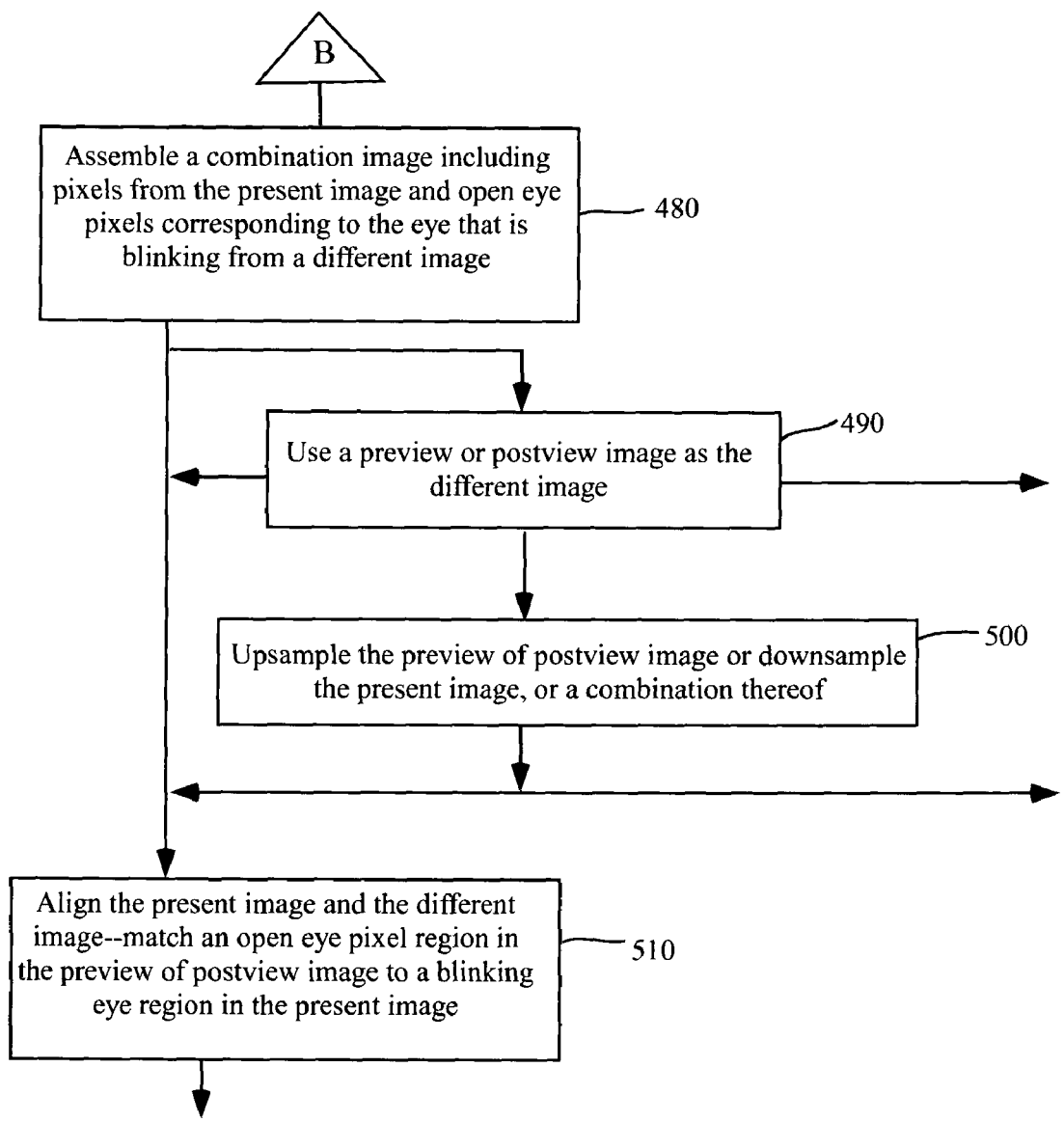
FIG. 4b illustrates a method of assembling a combination image in accordance with a preferred embodiment.

FIG. 1 illustrates a method for disqualifying a scene that includes a blinking eye in accordance with a preferred embodiment. A present image of a scene including a face region is acquired at 110. Optionally, the face region is identified at 120, and the face region analyzed to determine one or both eye regions therein. One or more groups of pixels corresponding to an eye region within the face region are identified at 130. It is determined whether the eye region is in a blinking process at 140. If the eye is determined to be in a blinking process at 140, then the scene is disqualified as a candidate for a processed, permanent image at 150. At this point, the process can simply stop or start again from the beginning, or a new image may be captured due to the disqualifying in order to replace the present image at 160. A warning signal may be provided regarding the blinking at 170. Full resolution capture of an image of the scene may be delayed at 180. As illustrated at FIGS. 4A and 4B, further processing of a present image may be stopped or a combination image may be assembled as a way of enhancing the disqualified image.

Figure 2:
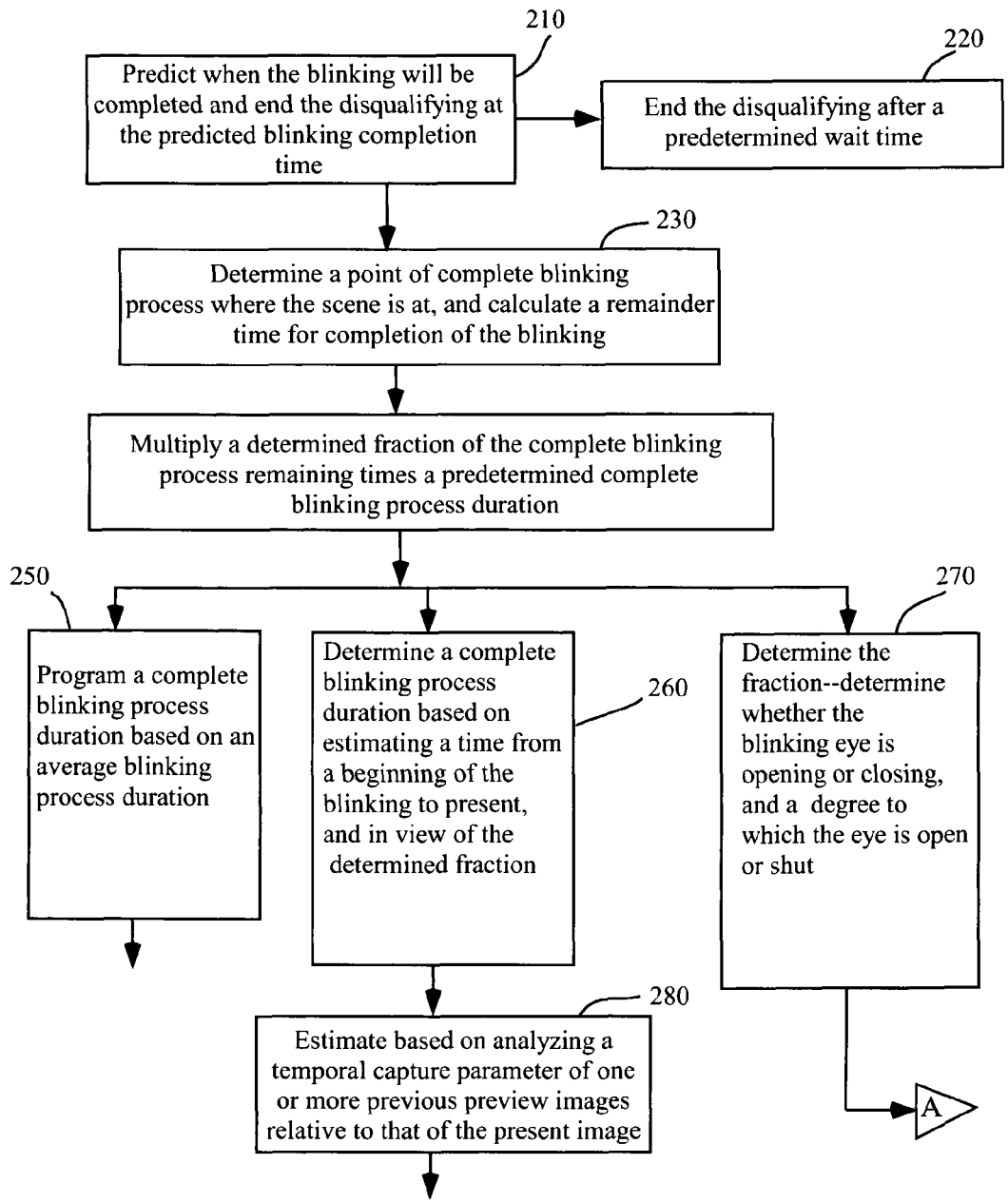
FIG. 2 illustrates a method of predicting a blinking completion time interval in accordance with a preferred embodiment.

FIG. 2 illustrates a method of predicting a blinking completion time interval in accordance with a preferred embodiment. It is predicted when the a blinking process will be completed at 210, and the disqualifying interval will end at the predicted blinking completion time. The interval may be set at a predetermined wait time 220. This may be set from a knowledge of an average blink of one quarter of a second or 250 milliseconds, or in a range from approximately 200-400 milli-seconds, or to 0.6, 0.8 or 1.0 seconds, however setting the wait time too long to ensure the blinking is complete disadvantageously permits a second blink to begin or simply makes everyone involved in taking the picture have to wait to too long for the disqualifying period to end. A more precise determination of the end of the blinking process is desired.

A point of a complete blinking process where a scene is at may be determined at 230 of FIG. 2, and then a remainder time can be calculated for completion of the blinking. For example, it may be determined that the blinking process observed is half way complete. In this example, the determined fraction is half or 0.5. This fraction can be advantageously multiplied times a predetermined complete blinking process duration at 240, e.g., 0.25 seconds, to get a completion time remaining of 0.125. With this more precise determination, there need not be excessive wait time for the disqualifying period to end, while still ensuring that the blinking is over before snapping the picture. Alternative, if multiple picture have been taken and the blinking is discovered in post-capture processing, then a more precise determination of which images will be disqualified can be determined based on known image capture times.

Figure 3:
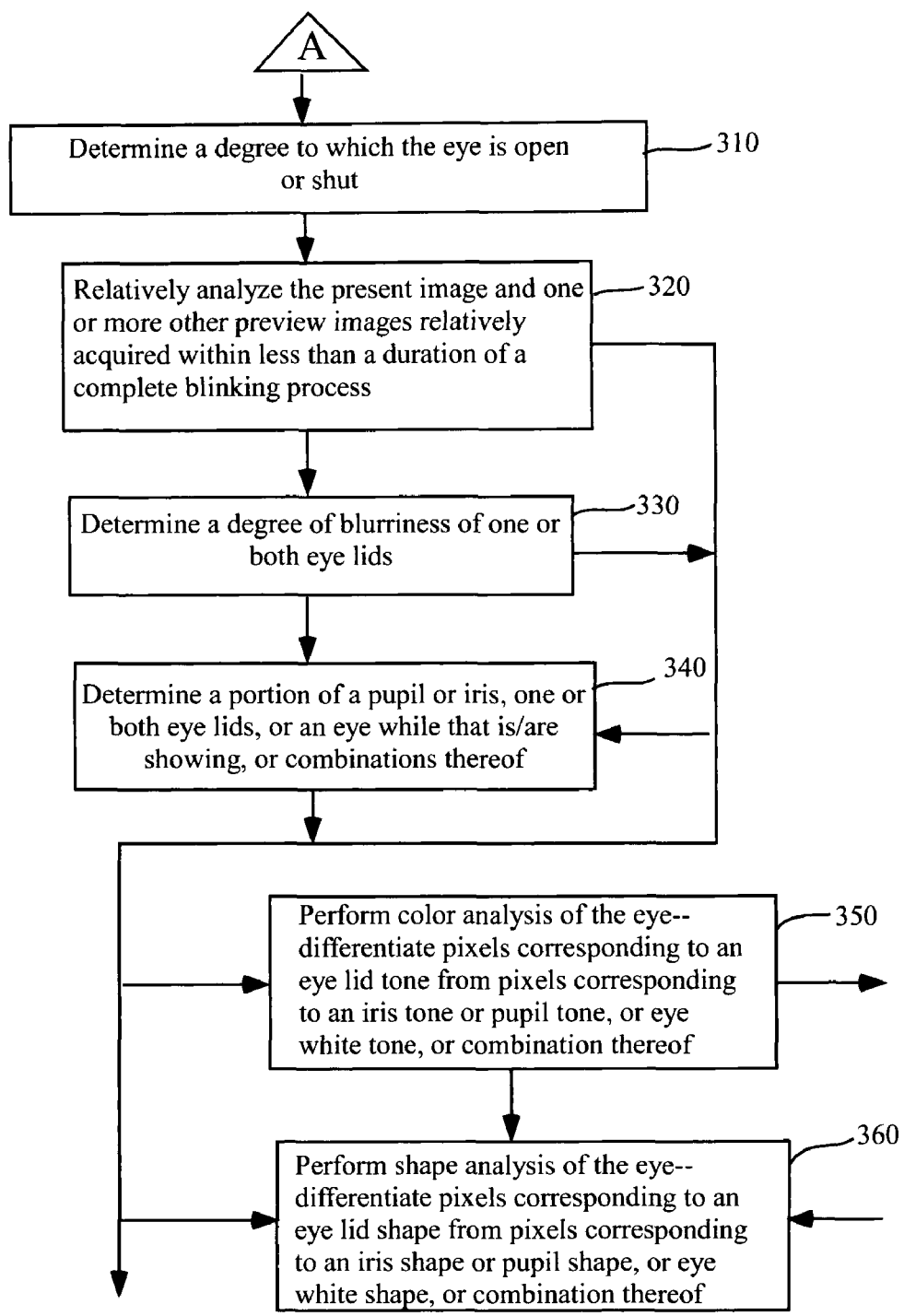
FIG. 3 illustrates a method of determining a degree to which an eye is open or shut in accordance with a preferred embodiment.

Various options are provided at FIG. 2 and FIG. 3 for inclusion in the process. At 250, a complete blinking process duration based on an average blinking process duration is programmed into the camera or other pre-capture or post-capture processing apparatus. At 240, a complete blinking process duration is determined based on estimating a time from a beginning of the blinking to present, and in view of the determined fraction. For example, if the determined fraction is one third, and the time from the beginning of the blinking to present is determined to be 0.09 seconds, the complete blink time estimated to be 0.27 seconds, of which 0.18 second remain. At 280, the estimation may be based on analyzing a temporal capture parameter of one of more previous preview images relative to that of the present image. For example, if a previous preview image shows a start of the blinking process, and the camera knows that the previous preview image was captured 0.08 seconds earlier, and the fraction is one third, then the blinking process may be predicted to end after another 0.16 seconds. At 270, the fraction is determined, including determining whether the blinking eye is opening or closing, and further determining a degree to which the eye is open or shut.

The determining a degree to which an eye may be open or shut is further provided at 310 of FIG. 3. To do this, the present image is preferably analyzed at 320 relative to one or more other preview images acquired within less than a duration of a complete blinking process. An optional determination of a degree of blurriness at 330 of one or both eye lids may facilitate a determination of blink speed. A portion of a pupil, iris, one or both eye lids or an eye white that is/are showing may be determined at 340 to facilitate determining how open or shut the blinking eye is. Color analysis 350 and shape analysis 360 may also be performed to differentiate pixels corresponding to features of open eyes such as a pupil, an iris and/or an eye white, from pixels corresponding to features of shut eyes, or eye lids that would appear in an eye region of a present scene.

FIG. 4a illustrates a method of determining whether to forego further processing of an image 410 in accordance with a preferred embodiment. In this case, determining a degree to which the eye is open or shut 420 is performed for a different purpose than to compute a blinking process completion time. In this embodiment, a threshold degree of closure of an eye may be preset, e.g., such that when an image is analyzed according to 420, 430, 440, 450, 460, or 470, or combinations thereof, similar to any or a combination of 310-360 of FIG. 3, then if the eye is shut to at least the threshold degree or greater, then the scene is disqualified, because the eye is too far shut. This can correspond to a situation wherein an eye is not blinking, or where an eye is at the very start or very end of a blinking process, such that the degree to which the eye is open is sufficient for keeping the image.

FIG. 4b illustrates a method of assembling a combination image in accordance with a preferred embodiment. At 480, a combination image is assembled including pixels from a present image and open eye pixels from a different image that correspond to the eye that is blinking in the present image. The different image may be a preview or postview image 490. In this case, particularly if the preview or postview image has lower resolution than the present image, then at 500 the preview image may be upsampled or the postview image may be downsampled, or a combination thereof. The present image and the different image are preferably aligned at 510 to match the open eye pixel region in the preview of postview image to the blinking eye region in the present image.

Figure 5:
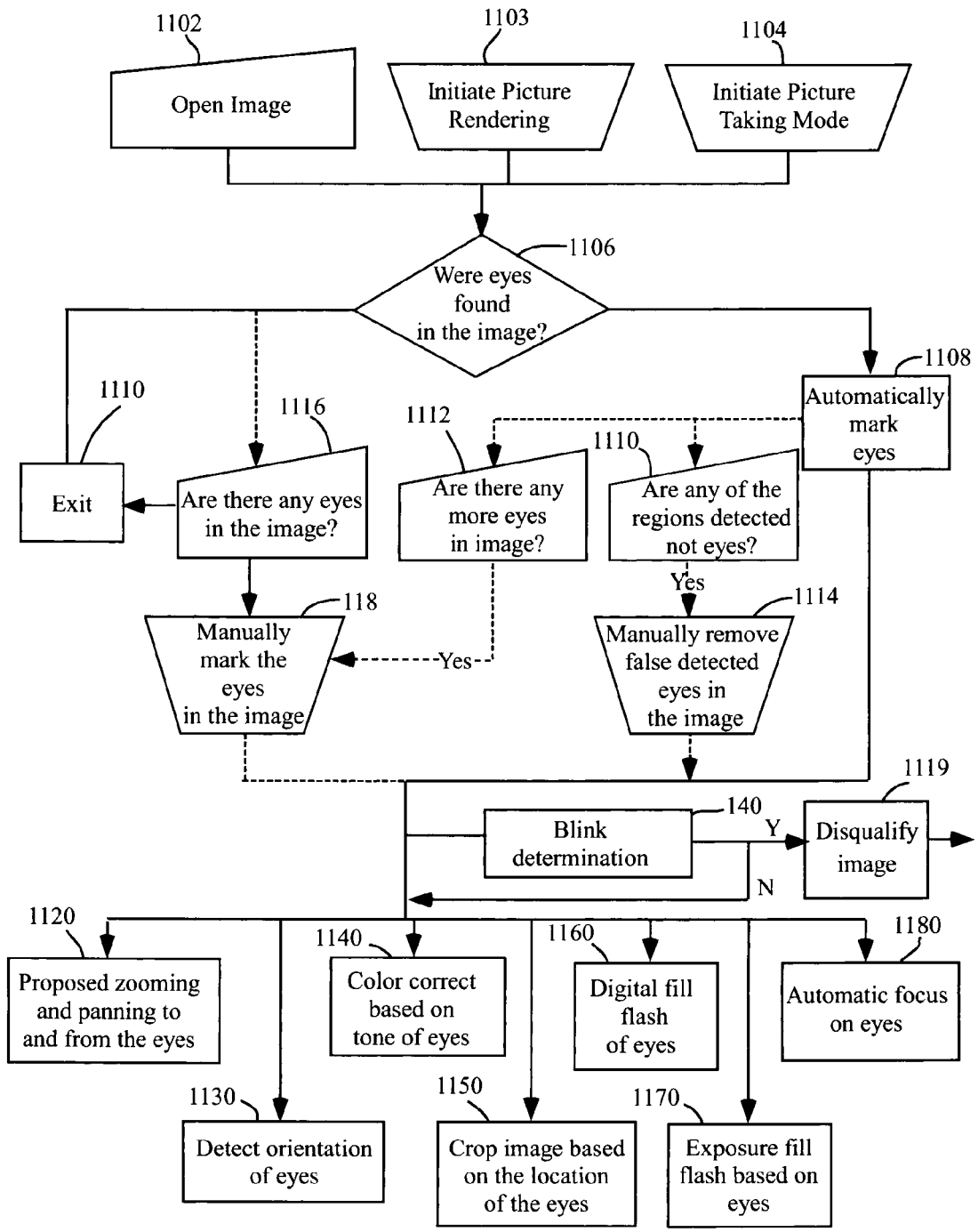
FIG. 5 illustrates a preferred embodiment of a workflow of correcting images based on finding eyes in the images.

FIG. 5 illustrates further embodiments. If one or more eyes are determined to be blinking in an image, then that image is preferably disqualified from being further processed in accordance with the following. Alternatively, the blinking determination 140 may be performed somewhere along the way, such as illustrated as an example in FIG. 5. An image may be opened by the application in block 1102. The software then determines whether eyes or faces, or both, are in the picture as described in block 1106. If no eyes or faces are detected, the software ceases to operate on the image and exits 1110. In what follows, only eyes will be typically referred to for efficiency, but either faces or eyes or both, or even another facial feature or other non-facial predetermined scene feature, may be the object of particular operations (see FIGS. 1, 110, 120 and 130 and U.S. application Ser. No. 10/608,776, which is incorporated by reference).

The software may also offer a manual mode, where the user, in block 1116 may inform the software of the existence of eyes, and manually marks them in block 1118. The manual selection may be activated automatically if no eyes are found, 1116, or it may even be optionally activated after the automatic stage to let the user, via some user interface to either add more eyes to the automatic selection 1112 or even 1114, remove regions that are mistakenly 1110 identified by the automatic process 1118 as eyes. Additionally, the user may manually select an option that invokes the process as defined in 1106. This option is useful for cases where the user may manually decide that the image can be enhanced or corrected based on the detection of the eyes. Various ways that the eyes may be marked, whether automatically of manually, whether in the camera or by the applications, and whether the command to seek the eyes in the image is done manually or automatically, are all included in preferred embodiments herein. In a preferred embodiment, faces are first detected, and then eyes are detected within the faces.

In an alternative embodiment, the eye detection software may be activated inside the camera as part of the acquisition process, as described in Block 1104. In this scenario, the eye detection portion 1106 may be implemented differently to support real time or near real time operation. Such implementation may include sub-sampling of the image, and weighted sampling to reduce the number of pixels on which the computations are performed. This embodiment is further described with reference to FIG. 6a.

In an alternative embodiment, the eye detection can then also make use of information provided from preview images to determine the location of the eyes in preview, thus expediting the analysis being performed in a smaller region on the final image.

In an alternative embodiment, the eye detection software may be activated inside the rendering device as part of the output process, as described in Block 1103. In this scenario, the eye detection portion 1106 may be implemented either within the rendering device, using the captured image or using a single or plurality of preview images, or within an external driver to such device. This embodiment is further described with reference to FIG. 6b.

After the eyes and/or faces or other features are tagged, or marked, whether manually as defined in 1118, or automatically 1106, the software is ready to operate on the image based on the information generated by the eye-detection, face detection, or other feature-detection stage. The tools can be implemented as part of the acquisition, as part of the post-processing, or both. As previously averred to, blink determination may be performed at this point at 140 (see FIGS. 1-4b and above). The image may be disqualified at 1119 if blinking is found, such that further processing, as known to one familiar in the art of digital photography is efficiently foregone.

Figure 6A:
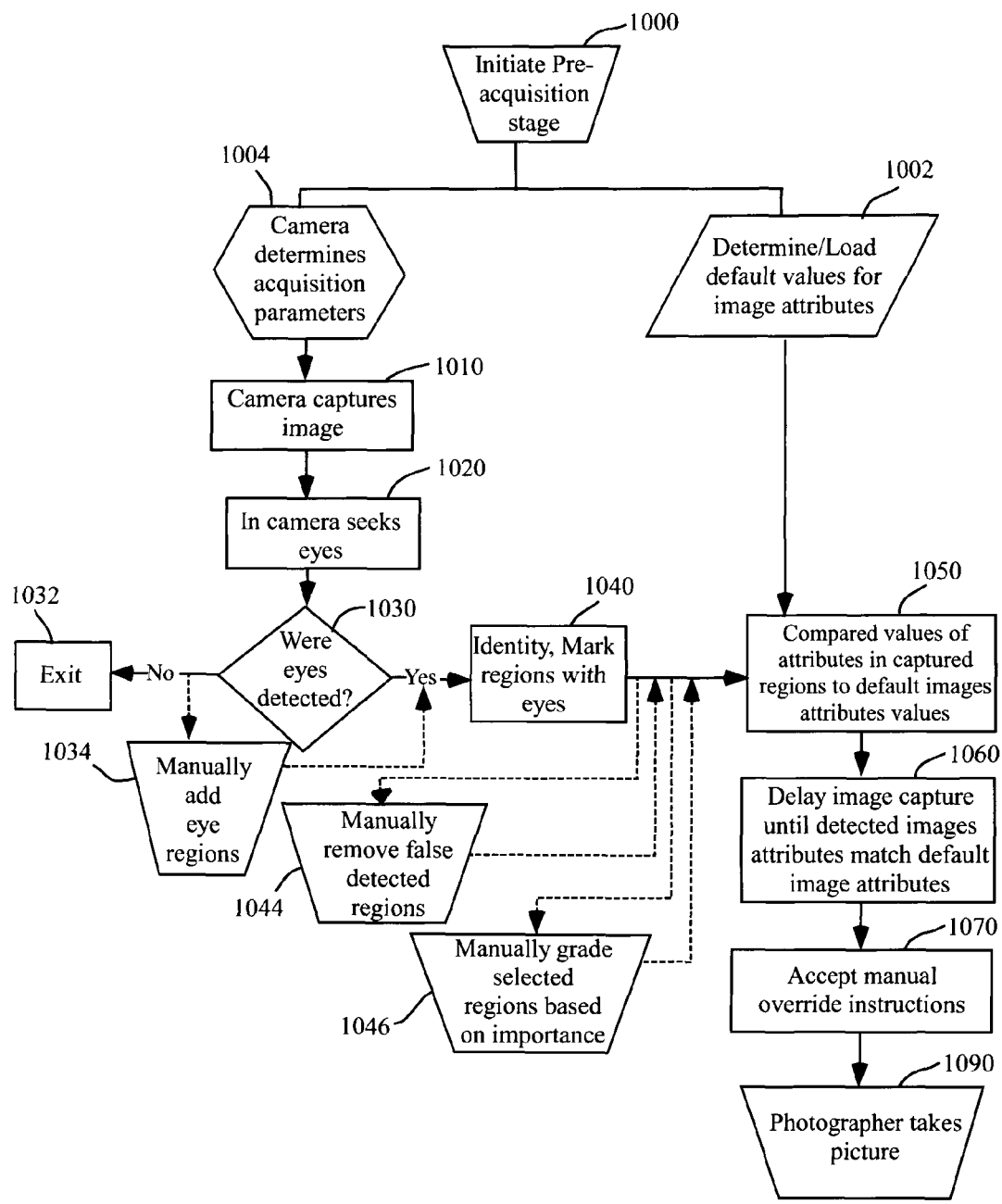
FIG. 6a illustrates a generic workflow of utilizing eye information in an image to delay image acquisition in accordance with a preferred embodiment.

Referring to FIG. 6a, which describes a process of using face detection to improve in camera acquisition parameters, as aforementioned in FIG. 5, block 1106. In this scenario, a camera is activated at 1000, for example by means of half pressing the shutter, turning on the camera, etc. The camera then goes through the normal pre-acquisition stage to determine at 1004 the correct acquisition parameters such as aperture, shutter speed, flash power, gain, color balance, white point, or focus. In addition, a default set of image attributes, particularly related to potential faces in the image, are loaded at 1002. Such attributes can be the overall color balance, exposure, contrast, orientation etc. Alternatively, at 1003, a collection of preview images may be analyzed to determine the potential existence of faces in the picture at 1006. A region wherein potentially the eyes will be when the full resolution is captured may also be predicted at 1008. This alternative technique may include moving on to block 1010 and/or 1002.

An image is digitally captured onto the sensor at 1010. Such action may be continuously updated, and may or may not include saving such captured image into permanent storage.

An image-detection process, preferably a face detection process, as known to one familiar in the art of image classification and face detection in particular, is applied to the captured image to seek eyes or faces or other features in the image at 1020. Such face detection techniques, include, but are not limited to: knowledge-based; feature-invariant; template-matching; appearance-based; color or motion cues; adaboost-based face detector, Viola-Jones, etc.

If no faces are found, the process terminates at 1032. Alternatively, or in addition to the automatic detection of 1030, the user can manually select, 1034 detected eyes or faces, using some interactive user interface mechanism, by utilizing, for example, a camera display. Alternatively, the process can be implemented without a visual user interface by changing the sensitivity or threshold of the detection process. Alternatively, this data may be available form a pre-capture process 1003.

When eyes or faces are detected, 1040, they are marked, and labeled. Detecting defined in 1040 may be more than a binary process of selecting whether an eye or a face is detected or not, it may also be designed as part of a process where each of the eyes or faces is given a weight based on size of the eyes or faces, location within the frame, other parameters described herein, which define the importance of the eye or face in relation to other eyes or faces detected.

Alternatively, or in addition, the user can manually deselect regions 1044 that were wrongly false detected as eyes or faces. Such selection can be due to the fact that an eye or a face was false detected or when the photographer may wish to concentrate on one of the eyes or faces as the main subject matter and not on other eyes or faces. Alternatively, 1046 the user may re-select, or emphasize one or more eyes or faces to indicate that these eyes or faces have a higher importance in the calculation relative to other eyes or faces. This process as defined in 1046 further defines the preferred identification process to be a continuous value one as opposed to a binary one. The process can be done utilizing a visual user interface or by adjusting the sensitivity of the detection process.

After the eyes or faces or other features are correctly isolated at 1040 their attributes are compared at 1050 to default values that were predefined in 1002. Such comparison will determine a potential transformation between the two images, in order to reach the same values. The transformation is then translated to the camera capture parameters 1070 and the image is acquired 1090.

A practical example is that if the captured face is too dark, the acquisition parameters may change to allow a longer exposure, or open the aperture. Note that the image attributes are not necessarily only related to the face regions but can also be in relations to the overall exposure. As an exemplification, if the overall exposure is correct but the faces are underexposed, the camera may shift into a fill-flash mode.

At 1060, capture is delayed until detected image attributes match default image attributes. An example in accordance with a preferred embodiment is to delay capture until eyes that are blinking and causing the delay are no longer blinking. At 1070, manual override instructions may be entered to take the picture anyway, or to keep a picture or to continue processing of a picture, even though blinking is detected within the picture. The picture is taken at 1090, or in accordance with another embodiment, the picture is stored in full resolution.

Figure 6B:
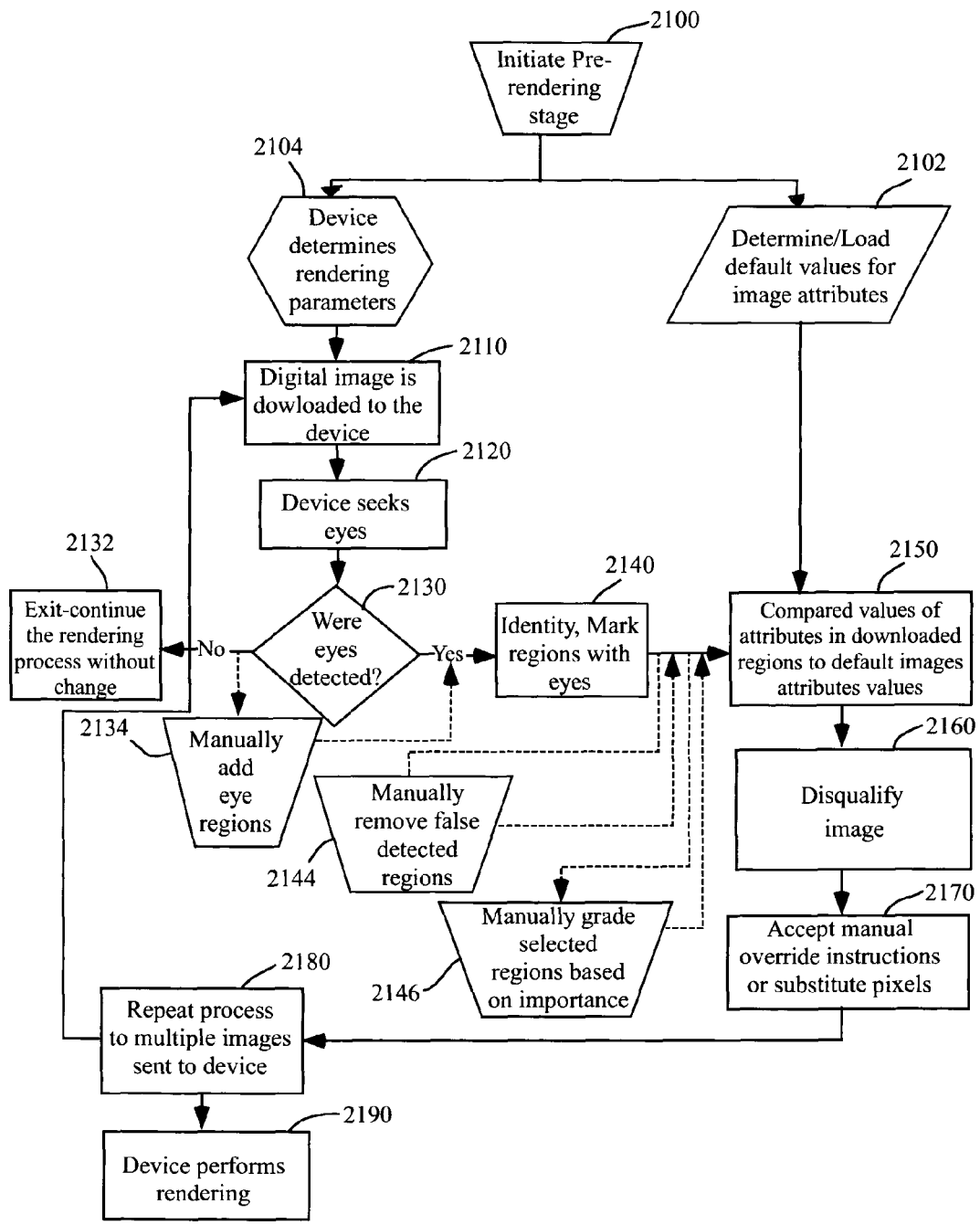
FIG. 6b illustrates a generic workflow of utilizing face information in a single or a plurality of images to adjust the image rendering parameters prior to outputting the image in accordance with a preferred embodiment.

Referring to FIG. 6b, a process is described for using eye, face or other feature detection to improve output or rendering parameters, as aforementioned in FIG. 5, block 1103. In this scenario, a rendering device such as a printer or a display, hereinafter referred to as "the device" is activated at 2100. Such activation can be performed for example within a printer, or alternatively within a device connected to the printer such as a PC or a camera. The device then goes through a normal pre-rendering stage to determine at 2104, the correct rendering parameters such as tone reproduction, color transformation profiles, gain, color balance, white point and resolution. In addition, a default set of image attributes, particularly related to potential eyes or faces in the image, are loaded at 2102. Such attributes can be the overall color balance, exposure, contrast, or orientation, or combinations thereof.

An image is then digitally downloaded onto the device 2110. An image-detection process, preferably an eye or a face detection process, is applied to the downloaded image to seek eyes or faces in the image at 2120. If no images are found, the process terminates at 2132 and the device resumes its normal rendering process. Alternatively, or in addition to the automatic detection of 2130, the user can manually select 2134 detected eyes or faces or other features, using some interactive user interface mechanism, by utilizing, for example, a display on the device. Alternatively, the process can be implemented without a visual user interface by changing the sensitivity or threshold of the detection process.

When eyes or faces are detected at 2130, they are marked at 2140, and labeled. Detecting in 2130 may be more than a binary process of selecting whether an eye or a face is detected or not. It may also be designed as part of a process where each of the eyes or faces is given a weight based on size of the faces, location within the frame, other parameters described herein, etc., which define the importance of the eye or face in relation to other eyes or faces detected.

Alternatively, or in addition, the user can manually deselect regions at 2144 that were wrongly false detected as eyes or faces. Such selection can be due to the fact that an eye or face was false detected or when the photographer may wish to concentrate on one or two of the eyes or one of the faces as the main subject matter and not on other eyes or faces. Alternatively, 2146, the user may re-select, or emphasize one or more eyes or faces to indicate that these eyes or faces have a higher importance in the calculation relative to other eyes or faces. This process as defined in 1146, further defines the preferred identification process to be a continuous value one as opposed to a binary one. The process can be done utilizing a visual user interface or by adjusting the sensitivity of the detection process.

After the eyes or faces or other scene or image features are correctly isolated at 2140, their attributes are compared at 2150 to default values that were predefined in 2102. At least one preferred attribute that the process is looking for is blinking eyes. Such comparison will determine a potential transformation between the two images, in order to reach the same values. The image may be disqualified at 2160 if one or more eyes are determined to be blinking. The disqualifying may be overridden manually at 2170 or open eye pixels may be substituted from a different image. The transformation may be translated to the device rendering parameters, and the image at 2190 may be rendered. The process may include a plurality of images. In this case at 2180, the process repeats itself for each image prior to performing the rendering process. A practical example is the creation of a thumbnail or contact sheet which is a collection of low resolution images, on a single display instance.

A practical example is that if the eyes or face were too darkly captured, the rendering parameters may change the tone reproduction curve to lighten the eyes or face. Note that the image attributes are not necessarily only related to the eye or face regions, but can also be in relation to an overall tone reproduction.

Referring to FIGS. 7a-7d, which describe automatic rotation of an image based on the location and orientation of eyes, faces, other face features, or other non-facial features, as highlighted in FIG. 5 at Block 1130. An image of two faces is provided in FIG. 7a. Note that the faces may not be identically oriented, and that the faces may be occluding. In this case, both eyes are showing on each face, but only one eye might be showing.

The software in the eye or face detection stage, including the functionality of FIG. 5, blocks 1108 and 1118, will mark the two faces or the four eyes of the mother and son, e.g., the faces may be marked as estimations of ellipses 2100 and 2200, respectively. Using known mathematical means, such as the covariance matrices of the ellipses, the software will determine the main axes of the two faces 2120 and 2220, respectively as well as the secondary axis 2140 and 2240. Even at this stage, by merely comparing the sizes of the axes, the software may assume that the image is oriented 90 degrees, in the case that the camera is in landscape mode, which is horizontal, or in portrait mode which is vertical or +90 degrees, aka clockwise, or −90 degrees aka counter clockwise. Alternatively, the application may also be utilized for any arbitrary rotation value. However, this information may not suffice to decide whether the image is rotated clockwise or counter-clockwise.

Figure 7A:
FIGS. 7a-7d illustrate face, eye or mouth detection, or combinations thereof, in accordance with one or more preferred embodiments.
Figure 7B:
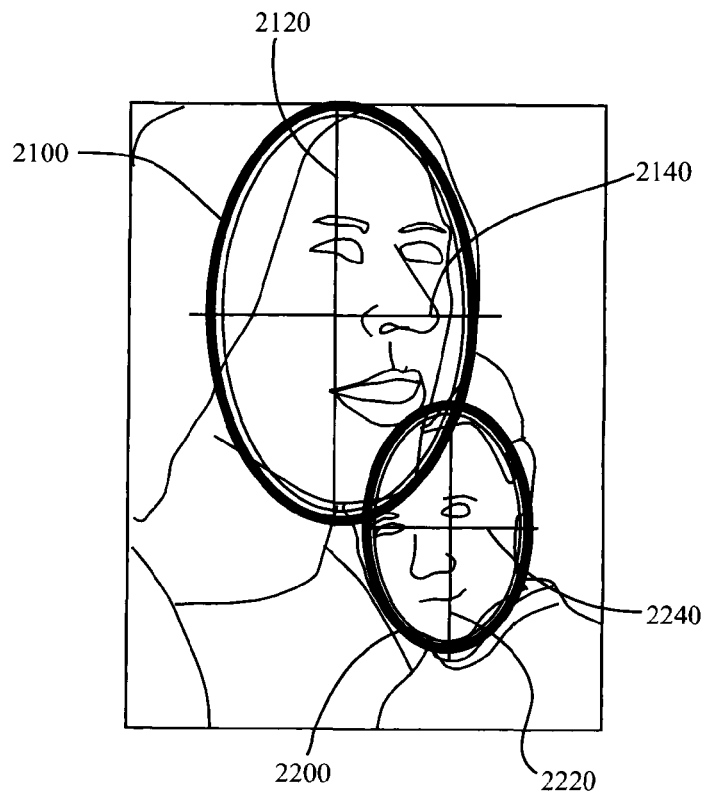
Figure 7C:
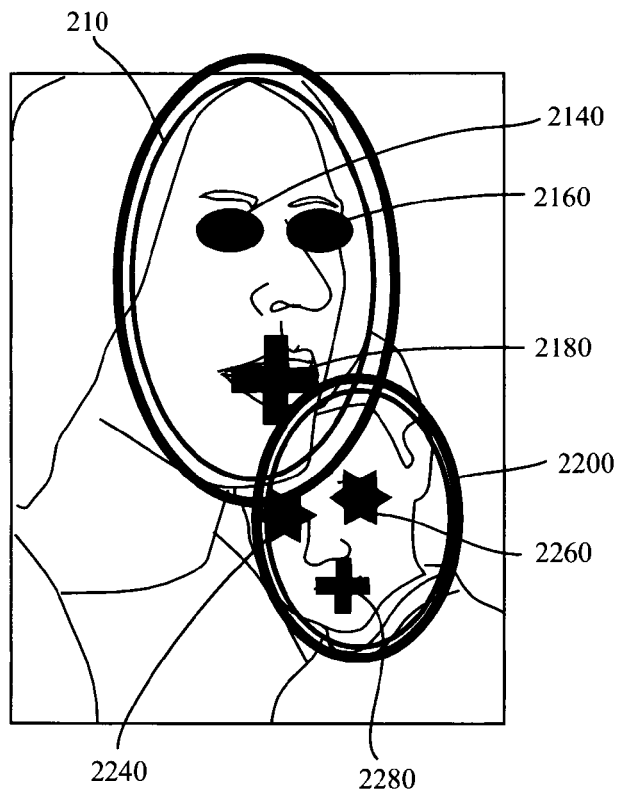
Figure 7D:
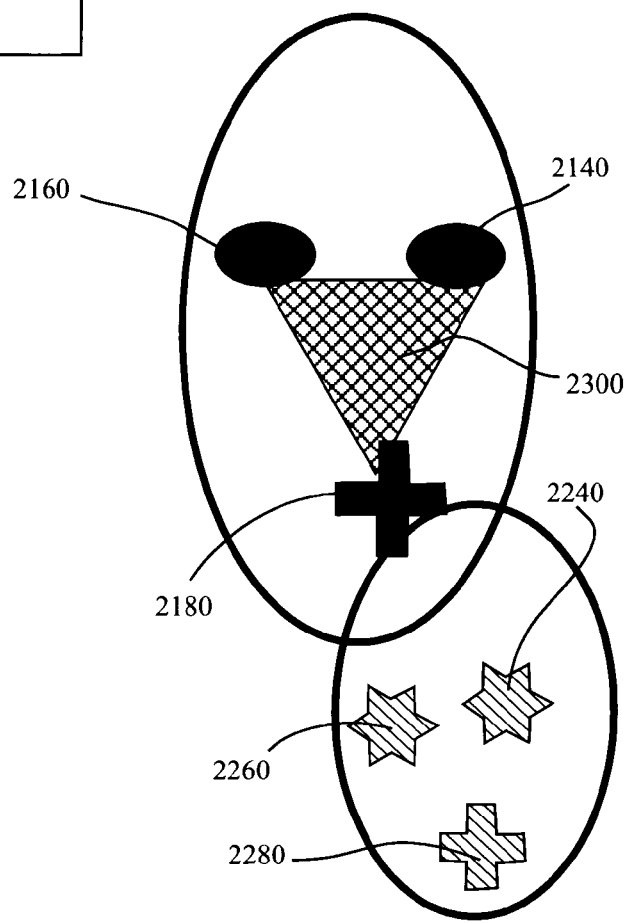

FIG. 7c describes the step of extracting the pertinent features of a face, which are usually highly detectable. Such objects may include the eyes, 2140, 2160 and 2240, 2260, and the lips, 2180 and 2280, or the nose, eye brows, eye lids, features of the eyes, hair, forehead, chin, ears, etc. The combination of the two eyes and the center of the lips creates a triangle 2300 which can be detected not only to determine the orientation of the face but also the rotation of the face relative to a facial shot. Note that there are other highly detectable portions of the image which can be labeled and used for orientation detection, such as the nostrils, the eyebrows, the hair line, nose bridge and the neck as the physical extension of the face, etc. In this figure, the eyes and lips are provided as an example of such facial features Based on the location of the eyes, if found, and the mouth, the image might ought to be rotated in a counter clockwise direction.

Note that it may not be enough to just locate the different facial features, but such features may be compared to each other. For example, the color of the eyes may be compared to ensure that the pair of eyes originated from the same person. Alternatively, the features of the face may be compared with preview images. Such usage may prevent a case where a double upper eyelid may be mistaken to a semi closed eye. Another example is that in FIGS. 7c and 7d, if the software combined the mouth of 2180 with the eyes of 2260, 2240, the orientation would have been determined as clockwise. In this case, the software detects the correct orientation by comparing the relative size of the mouth and the eyes. The above method describes exemplary and illustrative techniques for determining the orientation of the image based on the relative location of the different facial objects. For example, it may be desired that the two eyes should be horizontally situated, the nose line perpendicular to the eyes, the mouth under the nose etc. Alternatively, orientation may be determined based on the geometry of the facial components themselves. For example, it may be desired that the eyes are elongated horizontally, which means that when fitting an ellipse on the eye, such as described in blocs 2140 and 2160, it may be desired that the main axis should be horizontal. Similar with the lips which when fitted to an ellipse the main axis should be horizontal. Alternatively, the region around the face may also be considered. In particular, the neck and shoulders which are the only contiguous skin tone connected to the head can be an indication of the orientation and detection of the face.

A process for determining the orientation of images can be implemented in a preferred embodiment as part of a digital display device. Alternatively, this process can be implemented as part of a digital printing device, or within a digital acquisition device.

A process can also be implemented as part of a display of multiple images on the same page or screen such as in the display of a contact-sheet or a thumbnail view of images. In this case, the user may approve or reject the proposed orientation of the images individually or by selecting multiple images at once. In the case of a sequence of images, the orientation of images may be determined based on the information as approved by the user regarding previous images.]

Figure 8A:
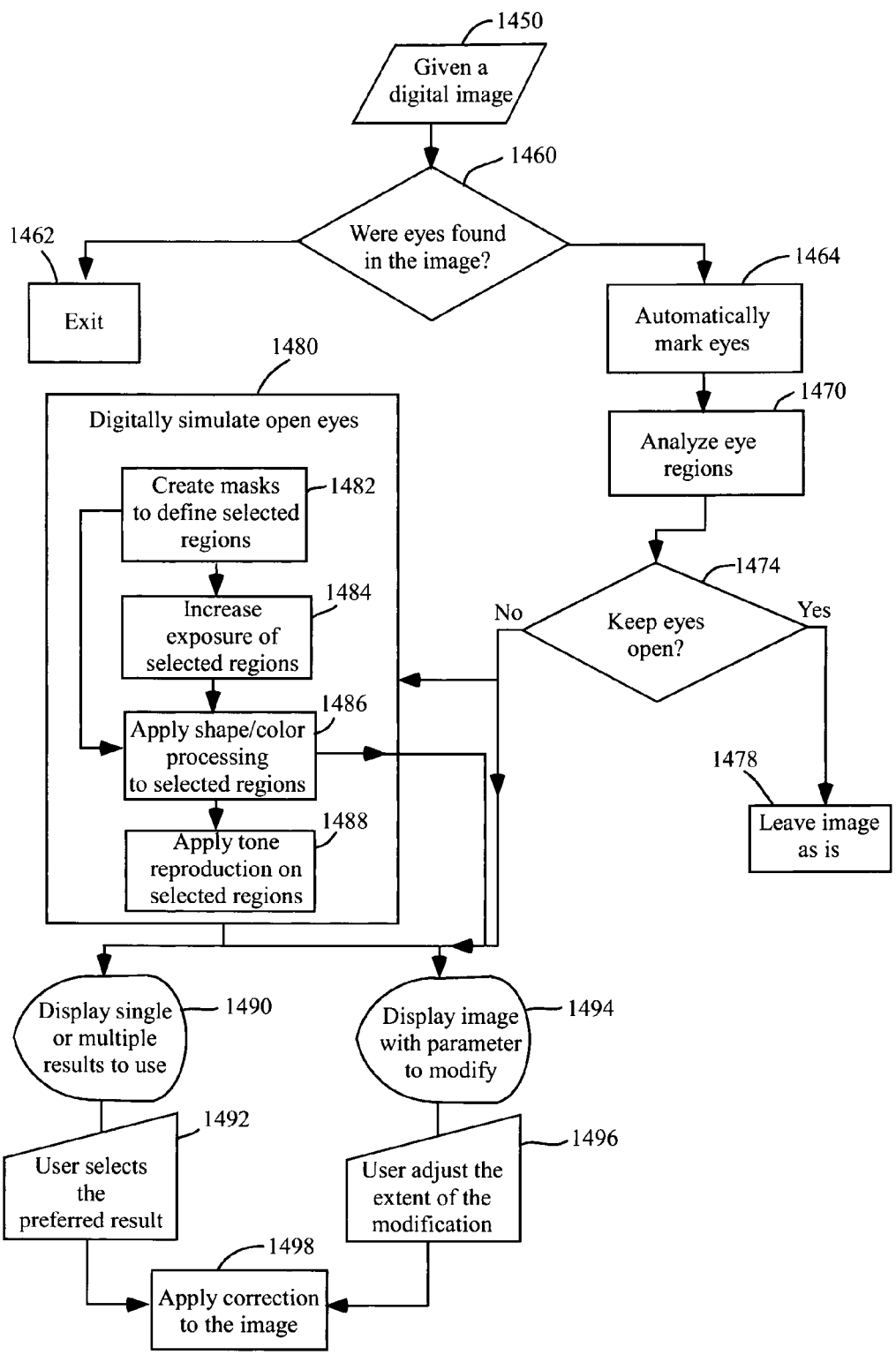
FIG. 8a illustrates a blink detection and correction method in accordance with one or more preferred embodiments.

Alternatively, as described by the flow chart of FIG. 8a, a similar method may be utilized in the pre-acquisition stage, to determine if digital simulation or re-compositioning of an image with open eyes may be advantageous or not, e.g., when an eye is determined to be blinking. U.S. Pat. No. 6,151,073 to Steinberg et al. is hereby incorporated by reference. In block 1108 of FIG. 5, the camera searched for the existence of eyes or faces in the image. At 1460, it is determined whether one or more eyes were founding the image. If not, then exit at 1462. If so, then the eyes are marked at 1464. The eye regions are analyzed at 1470. If the eyes are determined to be sufficiently open at 1474, then the image is left as is at 1478. However, if the eyes are not determined to be sufficiently open, or are closed beyond a threshold amount, then the process can proceed to correction at 1480, 1490 and/or 1494. At 1480, a sub-routine for digitally simulating open eyes is provided. A mask or masks define selected regions, i.e., in this example, eye regions. The exposure may be increased at 1484 or that may be skipped. Shape and/or color processing is performed at 1486 to the selected eye regions. For example, where closed eye lids exist in the original image, pupil, iris and eye white shapes and colors are provided between open eye lids to be substituted over the closed eye lids. Tone reproduction is provided at 1488.

At 1490, single or multiple results may be provided to a user. The user may select a preferred result at 1492, and the correction is applied at 1498. Alternatively, the image may be displayed at 1494 to the user with a parameter to be modified such as iris color or pupil shape. The user then adjusts the extent of the modification at 1496, and the image is corrected at 1498.

Figure 8B:
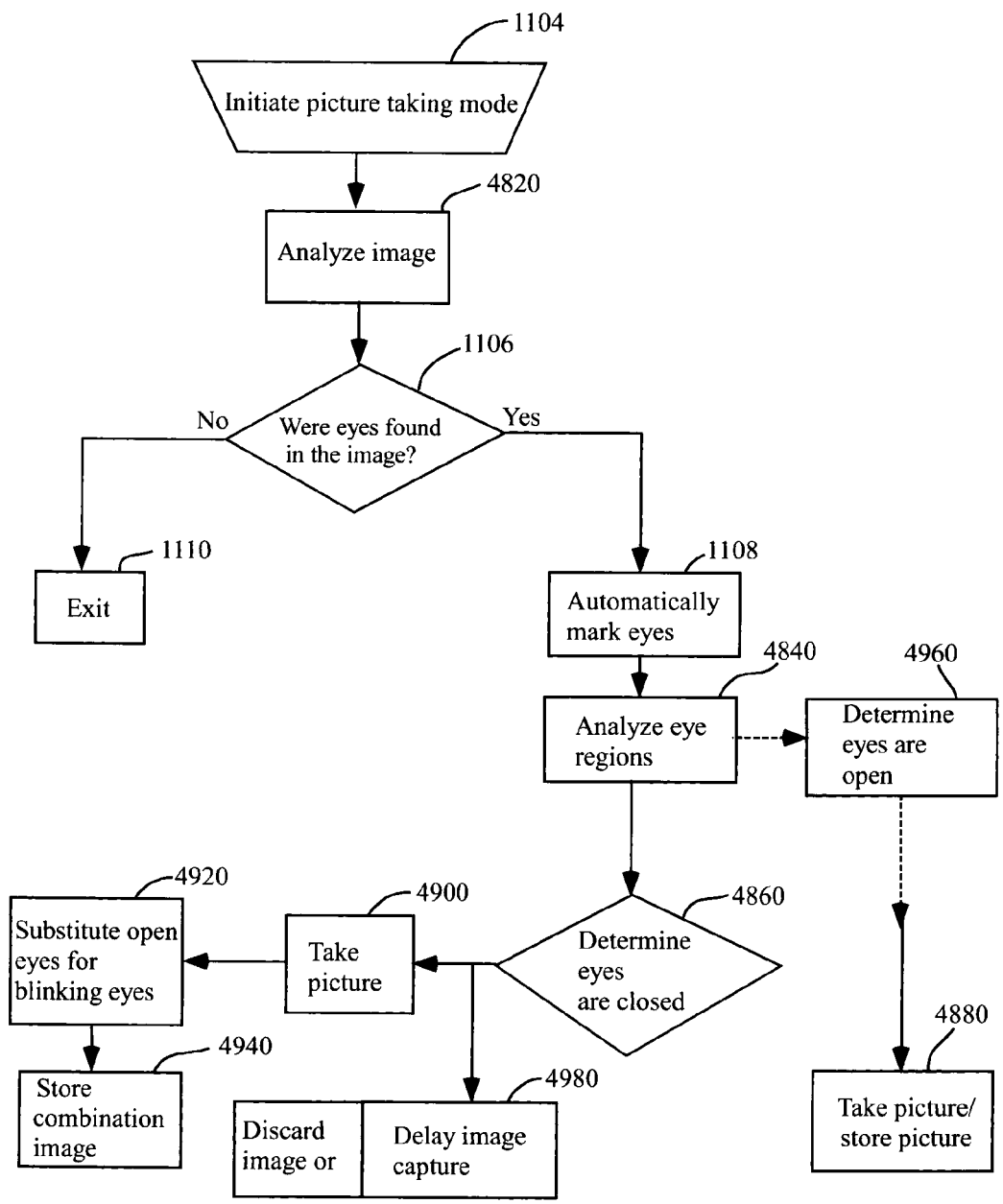
FIG. 8b describes an illustrative system in accordance with a preferred embodiment to determine whether an eye is blinking in the camera as part of the acquisition process, and whether to capture, discard or store the image, or whether to substitute an open eye for a blinking eye region.

FIG. 8b provides another workflow wherein picture taking mode is initiated at 1104 as in FIG. 5. The image is analyzed at 4820. A determination of whether eyes were found in the image is made at 1106. If not, then exit at 1110. If so, then the eyes are marked at 1108. The eye regions are analyzed at 4840, and if the eyes are open 4960, then the picture is either taken, stored (e.g., if the picture was previously taken) or taken and stored at 4880. If the eyes are determined to be closed at 4860, e.g., because blinking is taking place, then the image may be discarded or image capture delayed at 4980, or alternatively the picture may be taken at 4900. In this latter embodiment, open eyes regions are substituted for pixels of the blinking eyes at 4920, and the combination picture is stored at 4940.

Figure 9:
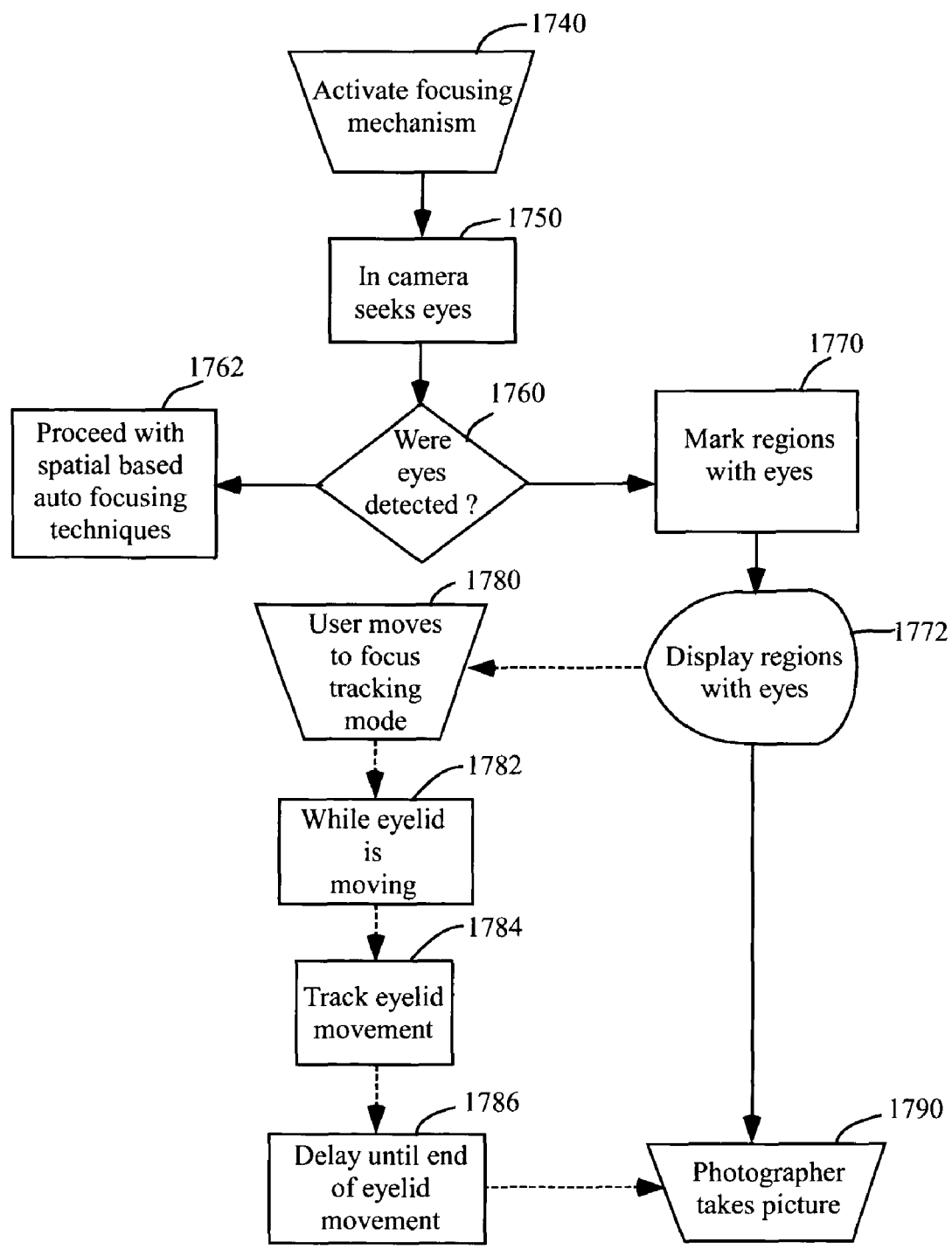
FIG. 9 illustrate an automatic focusing capability in the camera as part of the acquisition process based on the detection of an eye in accordance with one or more preferred embodiments.

FIG. 9 illustrates a technique involving motion of eye lids. A focusing mechanism is activated at 1170. The camera seeks the eyes at 1750. If eyes are not detected at 1760, then spatial based auto-focusing techniques may be performed at 1762. If eyes are detected, then regions are marked at 1770. The regions are displayed at 1772. The user may take the picture now at 1790. However, the user may move to focus tracking mode at 1780. While the eye lids are moving, e.g., during a blinking process 1782, the eye lid movement is tracked at 1784. A delay or scene disqualification is imposed while the eye lids are moving during the blinking process at 1786. When the disqualifying period ends, the user may take the picture, or the camera may be programmed to automatically take the shot at 1790.

What follows is a cite list of references which are, in addition to that which is described as background, the invention summary, the abstract, the brief description of the drawings and the drawings, and other references cited above, hereby incorporated by reference into the detailed description of the preferred embodiments as disclosing alternative embodiments:

U.S. Pat. Nos. 6,965,684, 6,301,440, RE33682, RE31370, U.S. Pat. Nos. 4,047,187, 4,317,991, 4,367,027, 4,638,364, 5,291,234, 5,488,429, 5,638,136, 5,710,833, 5,724,456, 5,781,650, 5,812,193, 5,818,975, 5,835,616, 5,870,138, 5,978,519, 5,991,456, 6,097,470, 6,101,271, 6,128,397, 6,148,092, 6,151,073, 6,188,777, 6,192,149, 6,249,315, 6,263,113, 6,268,939, 6,282,317, 6,301,370, 6,332,033, 6,393,148, 6,404,900, 6,407,777, 6,421,468, 6,438,264, 6,456,732, 6,459,436, 6,473,199, 6,501,857, 6,504,942, 6,504,951, 6,516,154, and 6,526,161;

U.S. published patent applications no. 2003/0071908, 2003/0052991, 2003/0025812, 2002/0172419, 2002/0114535, 2002/0105662, and 2001/0031142;

U.S. provisional application No. 60/776,338, entitled Human Eye Detector;

Japanese patent application no. JP5260360A2;

British patent application no. GB0031423.7;

Yang et al., IEEE Transactions on Pattern Analysis and Machine Intelligence, Vol. 24, no. 1, pp 34-58 (January 2002); and Baluja & Rowley, "Neural Network-Based Face Detection," IEEE Transactions on Pattern Analysis and Machine Intelligence, Vol. 20, No. 1, pages 23-28, January 1998.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to the claims below and/or preferred embodiments herein, the operations have been described in selected typographical sequences. However, the sequences have been selected and so ordered for typographical convenience and are not intended to imply any particular order for performing the operations, unless a particular ordering is expressly provided or understood by those skilled in the art as being necessary.

What is claimed is:

1. A method of disqualifying an acquired image as unsatisfactory for permanent storage based on facial expression, comprising:

using a digital image acquisition device including a lens, an image sensor and a processor programmed by processor-readable code embedded within one or more storage media;

acquiring one or more reference images of a scene including one or more face regions;

detecting at least one of said one or more face regions;

identifying within the at least one of said one or more face regions within the one or more reference images one or more groups of pixels corresponding to one or more eye pixel regions; and determining whether one or more expressions of said at least one of said one or more face regions are unsatisfactory, including analyzing the one or more eye pixel regions; and if so, then rejecting the scene for full resolution image capture, and instead capturing a consequent full resolution image at a later time, including delaying the timing of said capturing a consequent image for at least a calculated time for said expression to change.

2. The method of claim 1, further comprising providing a notification that said present image is unsatisfactory.

3. A method of disqualifying an acquired image as unsatisfactory for permanent storage based on facial expression, comprising:

using a digital image acquisition device including a lens, an image sensor and a processor programmed by processor-readable code embedded within one or more storage media;

acquiring a full resolution present image of a scene including one or more face regions;

detecting at least one of said one or more face regions;

identifying one or more groups of pixels corresponding to one or more eye pixel regions within at least one of the one or more face regions;

determining whether one or more expressions of said face portions are unsatisfactory, including analyzing the one or more eye pixel regions; and if so, then rejecting the present image for storage; and instead capturing a consequent full resolution image at a later time, including delaying the timing of said capturing a consequent image for at least a calculated time for said expression to change.

4. The method of claim 3, further comprising automatically initiating capturing a consequent image of the same scene.

5. A method of disqualifying an acquired image as unsatisfactory for permanent storage based on facial expression, comprising:

using a digital image acquisition device including a lens, an image sensor and a processor programmed by processor-readable code embedded within one or more storage media;

acquiring a present image of a scene including one or more face regions;

detecting at least one of said one or more face regions;

identifying one or more groups of pixels corresponding to one or more eye regions within at least one of the one or more face regions; and determining whether one or more expressions of said face portions are unsatisfactory; and if so, then rejecting the present image for storage, and wherein the identifying comprises identifying one or more groups of pixels corresponding to an eye region within at least one of the one or more face regions; and wherein the determining comprises determining whether the eye region is in a blinking process; and if so, then the rejecting comprises disqualifying the scene as a candidate for storage of the present image while the eye is completing the blinking; and instead capturing a consequent full resolution image at a later time, including delaying the timing of said capturing a consequent image for at least a calculated time for said blinking to be completed.

6. The method of claim 5, wherein the present image comprises a relatively low resolution preview image, and the disqualifying comprises delaying full resolution capture of an image of the scene.

7. The method of claim 5, wherein the present image comprises a full resolution capture image, and the method further comprises assembling a combination image including pixels from the present image and open-eye pixels corresponding to the eye that is blinking from a different image.

8. The method of claim 5, further comprising providing a warning signal regarding the blinking process.

9. A method for automatically disqualifying an unsatisfactory scene as an image acquisition control of a camera, comprising:

using a digital image acquisition device including a lens, an image sensor and a processor programmed by processor-readable code embedded within one or more storage media;

acquiring a relatively low resolution preview image;

extracting information from said relatively low resolution preview image;

determining whether one or more key features exist or should exist within the scene;

analyzing one or more regions of pixels within the relatively low resolution preview image corresponding to the one or more key features within the scene;

based on the analyzing of the one or more regions of pixels within the relatively low resolution preview image, determining whether one or more unsatisfactory expressions, shadowing, or occluding, or combinations thereof, of the one or more key features exist within the scene;

disqualifying the scene as a candidate for acquisition or storage, or both, of a full resolution image while any of one or more unsatisfactory expressions, shadowing, occluding or combinations thereof, of said one or more key features continue to exist; and instead capturing a consequent image at a later time, including delaying the timing of said capturing a consequent image for at least a calculated time for said unsatisfactory expressions, shadowing, occluding or combinations thereof, of said one or more key features, to change.

10. The method of claim 9, wherein the analyzing comprises identifying one or more groups of pixels that correspond to a facial feature having an unsatisfactory configuration.

11. The method of claim 10, wherein the one or more groups of pixels comprises an eye group, and the unsatisfactory configuration comprises a blinking configuration.

12. An image acquisition apparatus including an imaging optical system and digital image detector and storage medium, and having stored therein program instructions for programming one or more processors to perform a method for automatically disqualifying an unsatisfactory scene as an image acquisition control of a camera, the method comprising:

acquiring a relatively low resolution preview image;

extracting information from said relatively low resolution preview image;

determining whether one or more key features exist or should exist within the scene;

analyzing one or more regions of pixels within the relatively low resolution preview image corresponding to the one or more key features within the scene;

based on the analyzing of the one or more regions of pixels within the preview image, determining whether one or more unsatisfactory configurations, shadowing, occluding, or combinations thereof, of the one or more key features exist within the scene;

disqualifying the scene as a candidate for acquisition or storage, or both, of a full resolution image while any of one or more unsatisfactory configurations, shadowing, occluding or combinations thereof, of said one or more key features continue to exist; and instead capturing a consequent image at a later time, including delaying the timing of said capturing a consequent image for at least a calculated time for said unsatisfactory expressions, shadowing, occluding or combinations thereof, of said one or more key features, to change.

13. The apparatus of claim 12, wherein the analyzing comprises identifying one or more groups of pixels that correspond to a facial feature having an unsatisfactory configuration.

14. The apparatus of claim 13, wherein the one or more groups of pixels comprises an eye group, and the unsatisfactory configuration comprises a blinking configuration.

15. One or more computer readable media having processor readable code embodied thereon, said processor readable code for programming one or more processors to perform a method of disqualifying an acquired image as unsatisfactory for permanent storage based on facial expression, the method comprising:
   acquiring a full resolution present image of a scene including one or more face regions;
   detecting at least one of said one or more face regions;
   identifying one or more groups of pixels corresponding to one or more eye pixel regions within at least one of the one or more face regions;
   determining whether one or more expressions of said face portions are unsatisfactory, including analyzing the one or more eye pixel regions; and if so, then rejecting the present image for storage; and
   instead capturing a consequent full resolution image at a later time, including delaying the timing of said capturing a consequent image for at least a calculated time for said expression to change.

16. One or more computer readable media having processor readable code embodied thereon, said processor readable code for programming one or more processors to perform a method of disqualifying an acquired image as unsatisfactory for permanent storage based on facial expression, the method comprising:
   acquiring one or more reference images of a scene including one or more face regions;
   detecting at least one of said one or more face regions;
   identifying within the at least one of said one or more face regions within the one or more reference images one or more groups of pixels corresponding to one or more eye pixel regions; and
   determining whether one or more expressions of said at least one of said one or more face regions are unsatisfactory, including analyzing the one or more eye pixel regions; and if so, then rejecting the scene for full resolution image capture, and instead capturing a consequent full resolution image at a later time,
   including delaying the timing of said capturing a consequent image for at least a calculated time for said expression to change.

17. One or more computer readable media as in claim 16, wherein the method further comprises providing a notification that said present image is unsatisfactory.

18. The one or more storage devices as recited in 15, the method further comprising automatically initiating capturing a consequent image of the same scene.

19. One or more computer readable media having processor readable code embodied thereon, said processor readable code for programming one or more processors to perform a method of disqualifying an acquired image as unsatisfactory for permanent storage based on facial expression, the method comprising:
   acquiring a present image of a scene including one or more face regions;
   detecting at least one of said one or more face regions;
   identifying one or more groups of pixels corresponding to one or more eye regions within at least one of the one or more face regions; and
   determining whether one or more expressions of said face portions are unsatisfactory; and if so, then rejecting the present image for storage, and
   wherein the identifying comprises identifying one or more groups of pixels corresponding to an eye region within at least one of the one or more face regions; and
   wherein the determining comprises determining whether the eye region is in a blinking process; and if so, then the rejecting comprises disqualifying the scene as a candidate for storage of the present image while the eye is completing the blinking; and
   instead capturing a consequent full resolution image at a later time, including delaying the timing of said capturing a consequent image for at least a calculated time for said blinking to be completed.

20. The one or more computer readable media of claim 19, wherein the present image comprises a relatively low resolution preview image, and the disqualifying comprises delaying full resolution capture of an image of the scene.

21. The one or more computer readable media of claim 19, wherein the present image comprises a full resolution capture image, and the method further comprises assembling a combination image including pixels from the present image and open-eye pixels corresponding to the eye that is blinking from a different image.

22. The one or more computer readable media of claim 19, the method further comprising providing a warning signal regarding the blinking process.

* * * * *